May 20, 1969 — J. B. KING — 3,444,847
TEMPERATURE CONTROL ARRANGEMENT
Filed Sept. 29, 1966
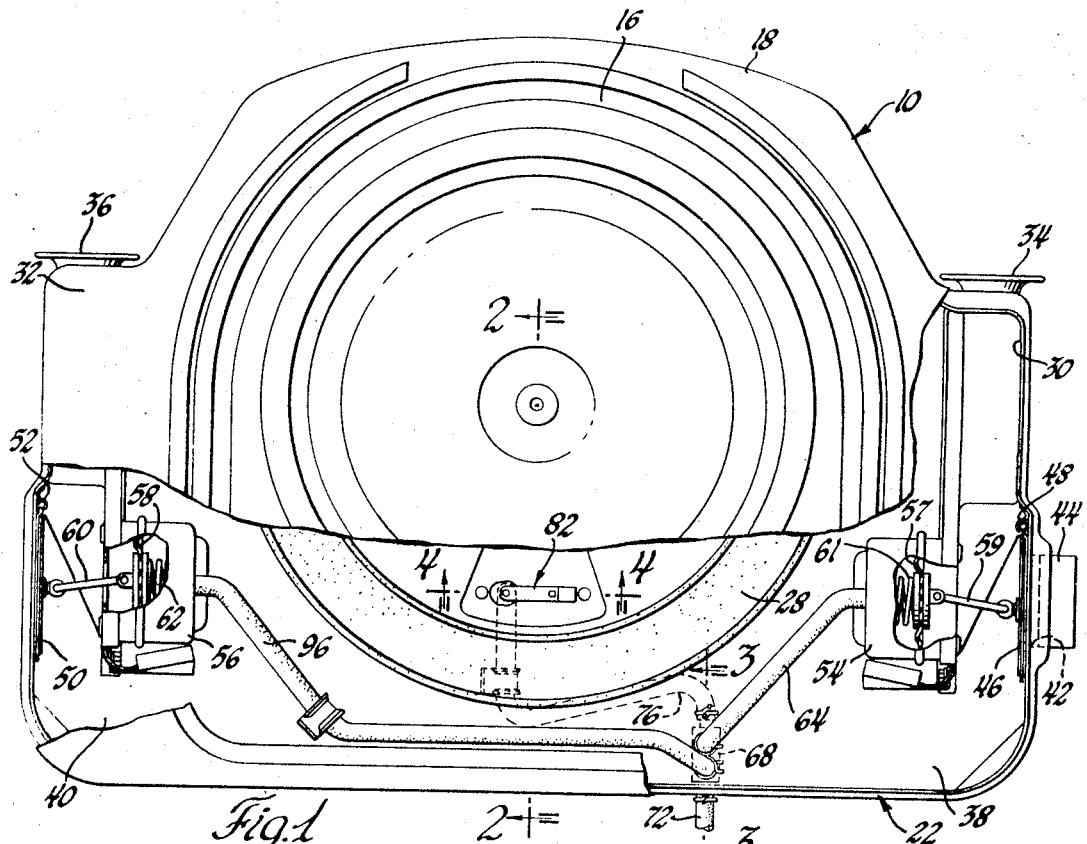
Fig.1
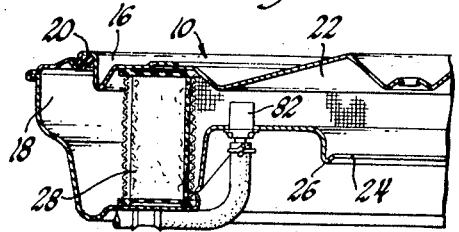
Fig.2
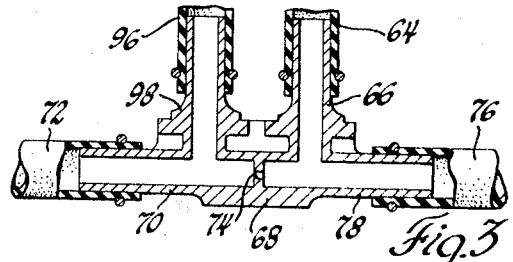
Fig.3
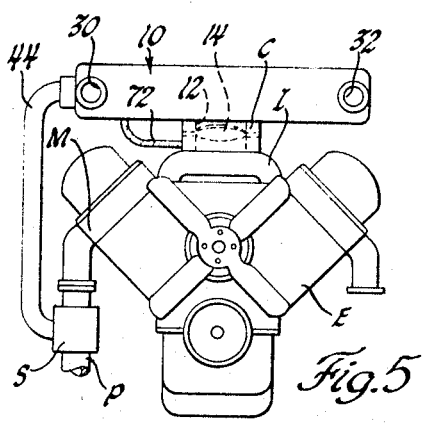
Fig.5
Fig.4
INVENTOR.
Jack B. King
BY
C. K. Veenstra
ATTORNEY 
United States Patent Office 3,444,847
Patented May 20, 1969

1

3,444,847
TEMPERATURE CONTROL ARRANGEMENT
Jack B. King, Royal Oak, Mich., assignor to General Motors Corporation, Detroit, Mich., a corporation of Delaware
Filed Sept. 29, 1966, Ser. No. 583,022
Int. Cl. F02m 31/06; F16k 17/00
U.S. Cl. 123—122                    5 Claims

ABSTRACT OF THE DISCLOSURE

An internal combustion engine air cleaner and silencer assembly having a pair of inlets for air at ambient temperature is connected to a source of heated air. A primary valve controls the flow of heated air into the air cleaner and the flow of ambient air through one inlet. The primary valve is positioned by an induction vacuum operated motor; the vacuum sensed by this motor is varied by a thermostatically operated air bleed. A secondary valve, operated by a motor responsive solely to induction vacuum, controls the flow of ambient air through the other inlet.

---

This invention relates to means for controlling the temperature of combustion air drawn through an internal combustion engine carburetor and intake manifold.

Frequent proposals made throughout many years have recommended arrangements for heating the air supplied through the induction system of an internal combustion engine. Such arrangements have as their object an improvement in vaporization of the fuel delivered into the air stream. When it is considered that the engine requires vaporized fuel for combustion and that fuel not vaporized cannot be completely burned in the combustion chamber, it will be appreciated that an improvement in vaporization of the fuel in the induction system permits a leaner calibration of the carburetor and a resultant, although perhaps only slight, improvement in operating economy. Even more important from the current viewpoint, however, is the reduction achieved in the emission of unburned hydrocarbons in the exhaust gases, accomplished by reducing the amount of unvaporized fuel which cannot be completely burned in the combustion chambers and which must be exhausted. As a further advantage, the addition of heat reduces the possibility of icing which may occur in the carburetor during low speed operation.

The prior arrangements generally approached their intended result by utilizing a thermostat, responsive to variations in temperature of some portion of the engine, to position a valve which mixes warmed and cool air. The disadvantage of such arrangements is that the thermostat must necessarily be strong enough to overcome the effects of friction and air flow on the valve. Such a thermostat is not only extremely large and expensive; it is relatively insensitive or only slowly responsive to temperature variations.

Furthermore, the prior proposals generally failed to recognize that during wide open throttle operation of the engine heating of the induction air flow is undesirable and may be unnecessary. The addition of heat reduces the density of the induction air flow and thus reduces the mass of air in the combustion chamber, thereby lessening the power output. It is also thought possible that the characteristics of air flow during wide open throttle operation are such that substantially complete evaporation may occur without the addition of heat.

The temperature control arrangement disclosed herein provides the requisite heating of the induction air flow during idle and part throttle operation and avoids heating of the air flow during wide open throttle operation. Temperature control is accomplished by a very small and sensitive thermostat which is responsive to the induction air flow temperature and which is not required to directly operate a valve arrangement. This is achieved by having an induction vacuum powered motor position the valve means to control warm and ambient temperature air flow and by utilizing the sensitive thermostat as a regulator for the vacuum signal which powers the motor.

The details as well as other objects and advantages of this invention are disclosed in the following description of a preferred embodiment shown in the drawings, in which:

FIGURE 1 is a top plan view of an air cleaner assembly with parts broken away to show the air flow control arrangement;

FIGURE 2 is a sectional view along line 2—2 of FIGURE 1 illustrating the location of the thermal control;

FIGURE 3 is a sectional view along line 3—3 of FIGURE 1 illustrating the interconnection of the vacuum lines;

FIGURE 4 is a sectional view along line 4—4 of FIGURE 1 illustrating the thermal sensor; and FIGURE 5 is a view of an internal combustion engine having the air cleaner mounted thereon and showing the connections to the induction system and to the air heating stove about the exhaust pipe.

Referring first to FIGURE 5, an internal combustion engine E includes an intake manifold I and a carburetor C which has an air cleaner and silencer assembly 10 mounted thereon. Carburetor C and intake manifold I form an induction passage 12 in which a throttle 14 is disposed to control the air flow to the engine. Engine E also includes an exhaust manifold M which discharges through an exhaust pipe P. A stove S is disposed about exhaust pipe P to provide a source of heated air.

Referring to the remaining figures, air cleaner 10 is constructed of upper and lower housing members 16 and 18 joined together with a sealing element 20 to form a chamber 22. The lower housing member 18 is provided with an outlet 24 having an annular rim 26 adapted for mounting on carburetor C. An annular air filter element 28 is disposed in chamber 22 surrounding outlet 24.

Disposed on opposite sides of air cleaner 10 are a pair of inlet conduits or snorkels 30 and 32 the ends 34 and 36 of which are open to air at ambient or underhood temperature at the front of air cleaner 10 and which discharge through openings 38 and 40 into chamber 22.

The primary inlet conduit 30 has a lateral opening 42 to which is connected a conduit 44 leading from stove S. A valve 46 is pivoted at 48 and may be swung between the position shown, preventing air flow through lateral opening 42, and a position preventing air flow through the open end 34 of primary snorkel 30. In the position shown, only air at ambient temperature may be admitted to the engine, whereas the valve 46 moves away from opening 42, increasing amounts of heated air and decreasing amounts of ambient air are admitted and mixed to flow to the engine.

Secondary snorkel 32 has no lateral opening for admission of warm air, but is provided with a valve 50 similarly pivoted at 52 to control the flow of air at ambient temperatures therethrough.

Valves 46 and 50 are positioned by a pair of vacuum motors including vacuum units 54 and 56 provided with pressure responsive diaphragms 57 and 58 connected through articulated links 59 and 60 to their respective valves. Vacuum units 54 and 56 are also provided with springs 61 and 62 biasing the valves 46 and 50 into the positions shown.

Vacuum unit 54 is connected through a vacuum conduit or line 64 to a connection 66 of member 68. Connection 70 of member 68 is connected through a line 72 with the induction passage 12 downstream of throttle 14. The induction vacuum sensed through line 72 is reduced by a restriction 74 in member 68 to provide a vacuum signal proportional to induction vacuum for operating vacuum unit 54.

A line 76 extends from a connection 78 of member 68 to the outlet 80 of a thermal sensor 82 located in chamber 22 on the downstream or clean air side of filter element 28. Thermal sensor 82 includes an orifice 84 providing an opening for clean air flow from chamber 22 through conduits 76 and 64 to vacuum unit 54. A valve member 86, which includes a spherical head 88 contacting the outlet side of orifice 84, is positioned to control air flow through orifice 84 by a cantilever thermostat 90 riveted at one end to a stationary arm 92 and secured at the other end to valve member 86. The tension in thermostat 90 may be adjusted by a screw 94 which positions arm 92.

In operation, when the engine is started and air flows through air cleaner 10, its temperature is sensed by thermostat 90. At temperatures below a predetermined value of perhaps 70°, thermostat 90 holds valve 88 against orifice plate 84 so that the full vacuum signal is sensed by vacuum unit 54. Diaphragm 57 is pulled back against spring 61 and valve 46 closes snorkel 30 against air flow through open end 34, permitting only warm air flow through lateral opening 42. As the air flow warms above the predetermined temperature, thermostat 90 begins to relax and the vacuum signal pulls valve head 88 away from orifice 84 to bleed air through lines 76 and 64 to vacuum unit 54. As air flows through orifice 84 the vacuum below valve head 88 is reduced, creating a tendency for valve 86 to close and thus reducing the air bleed and increasing the vacuum signal. Valve 86 thus oscillates to create a substantially constant vacuum signal less than that created by orifice 74 alone. This vacuum signal positions diaphragm 57 to hold valve 46 in an intermediate position, allowing air flow through both open end 34 of primary snorkel 30 and lateral opening 42. As the temperature of the mixed air flow further increases, the thermostat 90 may, if desired, relax to a point where valve 88 is continually open so that no vacuum signal is sensed by vacuum unit 54 and so that valve 46 permits only air flow at ambient temperature through air cleaner 10 and induction passage 12.

Under conditions of wide open throttle operation it is desirable to have the air flow into the combustion chambers as cool and dense as possible to achieve maximum power output. When operating under such conditions, of course, fuel economy is not a major consideration. In addition, the air flow under such conditions is sufficient to adequately vaporize the fuel delivered by the carburetor, heat being unnecessary. Therefore, the vacuum unit 54 is so calibrated that any slight vacuum signal which may be generated under wide open throttle conditions is insufficient to operate the diaphragm 57, and valve 46 closes lateral opening 42 to admit only air flow at ambient temperatures through open end 34 of primary snorkel 30.

The vacuum unit 56 which operates valve 50 to control air flow through secondary snorkel 32 is connected by a vacuum line 96 to a connection 98 on member 68. Vacuum unit 56 is connected to induction passage 12 through vacuum line 72 before restriction 74 so that the full value of induction vacuum is sensed by the vacuum unit 56. Therefore, under most conditions of operation diaphragm 58 operates valve 50 to prevent air flow through secondary snorkel 32. However, when the value of the induction vacuum falls below a predetermined value, indicating an engine demand for air flow at rates above the capacity of primary snorkel 30, vacuum unit 56 opens valve 50 to permit air flow through secondary snorkel 32. It will be appreciated that the air bled through orifice 84 does not substantially affect operation of vacuum unit 56 due to the effect of restriction 74 in element 68.

As shown and described, thermostat 90 controls the temperature of the air mixture delivered to the engine but does not need to be strong enough to directly operate the mixing valve 46. In addition, the system provides means to supply air at ambient temperatures during wide open throttle operation regardless of the ambient temperature so that maximum power may be achieved and yet to supply air at a controlled temperature under other conditions of operation.

I claim:

1. An internal combustion engine comprising a carburetor and an intake manifold forming an air induction passage, a throttle in said induction passage controlling flow therethrough, first inlet means for said induction passage upstream of said carburetor open to air at ambient temperatures, a source of air warmed to temperatures greater than ambient, second inlet means for said induction passage upstream of said carburetor connected to said source of warm air, ambient air flow through said first inlet means and warm air flow through said second inlet means being mixed to provide an induction air flow at temperatures greater than ambient, valve means controlling air flow through said first and second inlet means to regulate the temperature of induction air flow through said carburetor and intake manifold, spring means biasing said valve means to permit ambient air flow through said first inlet means and to prevent warm air flow through said second inlet means, a vacuum motor connected to said valve means, said vacuum motor including a vacuum conduit extending to said induction passage downstream of said throttle, said vacuum motor exerting a force on said valve means in opposition to the bias of said spring means whereby said valve means is positioned in accordance with variations in induction vacuum, and a thermal control regulating the vacuum sensed by said vacuum motor whereby said valve means may also be positioned in accordance with temperature conditions, said thermal control including an orifice providing an opening for air flow into said vacuum motor to reduce the induction vacuum sensed by said vacuum motor, a valve member controlling air flow through said orifice, and thermostatically responsive means positioning said valve member to permit increased air flow through said orifice in response to an increase in temperature whereby said vacuum motor may position said valve means to permit increased ambient air flow through said first inlet means and decreased warm air flow through said second inlet means.

2. The internal combustion of claim 1 wherein said thermostatically responsive means is responsive to the temperature of induction air flow downstream of said valve means.

3. The internal combustion engine of claim 1 wherein said valve member engages the outlet side of said orifice whereby said thermostatically responsive means need not overcome the force of induction vacuum when opening said valve member.

4. The internal combustion engine of claim 1 wherein said thermostatically responsive means is a cantilever bimetallic element secured against movement at one end and connected to said valve member at the opposite end.

5. The internal combustion engine of claim 1 wherein said vacuum conduit includes a restriction between said induction passage and said orifice whereby a reduced signal proportional to induction vacuum is created for operation of said vacuum motor.

References Cited

UNITED STATES PATENTS

| | | |
|---|---|---|
| 1,242,926 | 10/1917 | Donning. |
| 1,448,008 | 3/1923 | Smith. |
| 2,058,204 | 10/1936 | Ball et al. |
| 2,082,397 | 6/1937 | Hiscock. |
| 2,123,347 | 7/1938 | Ware. |
| 2,395,997 | 3/1946 | Eckel _____ 261—16 X |
| 2,763,252 | 9/1956 | Dolza et al. |
| 2,983,592 | 5/1961 | Jones _____ 48—180 X |
| 3,081,984 | 3/1963 | Wise _____ 261—23 |
| 3,092,091 | 6/1963 | Bosley. |

HARRY B. THORNTON, *Primary Examiner.*

D. E. TALBERT, JR., *Assistant Examiner.*

U.S. Cl. X.R.

48—180; 55—276, 385, 417, 419, 510; 137—457; 181—33; 261—16